United States Patent
Christensen et al.

(10) Patent No.: US 9,519,922 B2
(45) Date of Patent: Dec. 13, 2016

(54) SYSTEM AND METHOD FOR AUTOMATIC ELECTRONIC DOCUMENT IDENTIFICATION

(71) Applicant: RAKUTEN KOBO, INC., Toronto (CA)

(72) Inventors: Jordan Christensen, Toronto (CA); Darius Braziunas, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 240 days.

(21) Appl. No.: 14/097,078

(22) Filed: Dec. 4, 2013

(65) Prior Publication Data
US 2015/0154671 A1    Jun. 4, 2015

(51) Int. Cl.
*G06Q 30/06* (2012.01)
*G06F 17/30* (2006.01)
*G06Q 10/00* (2012.01)

(52) U.S. Cl.
CPC ..... *G06Q 30/0603* (2013.01); *G06F 17/30722* (2013.01); *G06Q 10/00* (2013.01); *G06Q 30/0631* (2013.01)

(58) Field of Classification Search
CPC .. G06F 17/277; G06F 17/30722; G06Q 10/00; G06Q 30/0603; G06Q 30/0631
See application file for complete search history.

(56) References Cited

U.S. PATENT DOCUMENTS

| | | | |
|---|---|---|---|
| 7,299,261 B1 | 11/2007 | Oliver et al. | |
| 7,437,368 B1 * | 10/2008 | Kolluri | G06F 17/30864 |
| 8,494,985 B1 * | 7/2013 | Keralapura | H04L 63/045 |
| | | | 706/12 |
| 8,554,640 B1 * | 10/2013 | Dykstra | G06Q 10/101 |
| | | | 705/14.49 |
| 2006/0173891 A1 * | 8/2006 | Berstis | G06F 3/0485 |
| 2007/0203955 A1 * | 8/2007 | Pomerantz | G06F 17/30017 |
| 2008/0059803 A1 * | 3/2008 | Tung | G06K 9/00899 |
| | | | 713/176 |
| 2009/0204663 A1 * | 8/2009 | Patwari | H04N 7/17318 |
| | | | 709/203 |
| 2009/0287991 A1 * | 11/2009 | Nakamura | G06F 17/30333 |
| | | | 715/210 |
| 2010/0281538 A1 | 11/2010 | Yu | |
| 2011/0087690 A1 * | 4/2011 | Cairns | G06F 17/30097 |
| | | | 707/769 |
| 2011/0208614 A1 * | 8/2011 | Tom | G06Q 30/0601 |
| | | | 705/27.1 |
| 2011/0252311 A1 * | 10/2011 | Kay | G06F 17/243 |
| | | | 715/255 |
| 2014/0214578 A1 * | 7/2014 | Kirkpatrick | G06Q 30/0601 |
| | | | 705/26.1 |

* cited by examiner

*Primary Examiner* — Brian J Gillis
*Assistant Examiner* — Gil H. Lee
(74) *Attorney, Agent, or Firm* — Oblon, McClelland, Maier & Neustadt, L.L.P.

(57) ABSTRACT

A system and method for automatically identifying an electronic document. The method includes accessing, within an electronic device, an electronic document and extracting text from the electronic document. A signature is then determined based on the text of the electronic document and the signature is communicated over a communication channel. The method further includes receiving an identifier of the electronic document over the communication channel. In one embodiment, the identifier is determined by a server matching the signature against a signature library. The method further includes receiving a bookmark associated with the electronic document.

17 Claims, 5 Drawing Sheets

SYSTEM AND METHOD FOR AUTOMATIC ELECTRONIC DOCUMENT IDENTIFICATION

FIELD OF THE INVENTION

Embodiments of the present invention are generally related to electronic documents and devices operable for displaying electronic documents.

BACKGROUND

As computing technology has advanced, computers have become smaller and more portable thereby bringing about powerful handheld devices capable of performing functions of more traditional computing technology. At the same time electronic devices have increasingly been used for reading and as a substitute for printed, physical books, publications, and documents. Such a device may be referred to as an eReader and an electronic book may be referred to as an eBook.

With the increase in devices being used as eReaders, eBooks may be acquired from a variety of sources. An eReader may have a customized or local catalogue application for allowing a user to access and browse eBooks on the eReader. Value added services may be applied to eBooks that are obtained from the catalogue application, such as synchronizing bookmarks across devices and personalized recommendations. EBooks that are acquired from a source outside of the catalogue application are not presentable with the catalogue application and therefore not available for value added services. For example, the catalogue application may not have sufficient information about an eBook acquired from an external source. Each eBook may have metadata associated with the eBook, for example, including the title and author. However, metadata information about the particular eBook is not standardized thereby making it difficult to identify the particular eBook based solely on the metadata. Thus, eBooks from other sources are not easy to identify and therefore not available for the value added services from the catalogue application and are not available within the catalogue application.

SUMMARY OF THE INVENTION

Accordingly, what is needed is a solution for identifying electronic documents thereby allowing the electronic documents to be added to a catalogue of electronic documents and thereby used for value added services. Embodiments of the present invention are operable to automatically identify an electronic document from a third party source and thereby provide value added services based on the identification of the electronic document. The electronic documents may be acquired from an electronic publication source other than the electronic publication source associated with the provider of the device. The identification of the electronic document allows the electronic document to be added to an electronic document catalogue or library (e.g., user library of eBooks) of the device. The identification of the electronic document further allows value added services including, but not limited to, bookmarking services (e.g., bookmark synchronization), recommendations, backup services, electronic documents offers, catalogue migration or importation (e.g., from other electronic document sources), and profile updating.

In one embodiment, the present invention is directed to a method for automatically identifying an electronic document. The method includes accessing, within an electronic device, an electronic document and extracting text from the electronic document. A signature is then determined based on the extracted text of the electronic document and the signature may be communicated to another device (e.g., over a communication channel). The method further includes receiving an identifier of the electronic document (e.g., over the communication channel) and receiving a bookmark associated with the electronic document. In one embodiment, the identifier is determined by a server matching the signature against a signature library. The method may further include in response to receiving the identifier of the electronic document, executing a function associated with the electronic document based on the identifier of the electronic document. In one embodiment, the function comprises displaying a recommendation based on the identifier of the electronic document. In another embodiment, the function comprises a catalogue importation function. In one embodiment, the function comprises a bookmark synchronization function based on the identifier of the electronic document. In another embodiment, the function comprises updating a profile based on the identifier of the electronic document. In one embodiment, the function comprises displaying an offer for purchase of the electronic document.

In one embodiment, the present invention is directed to a method for automatically identifying an electronic publication or electronic document. The method includes accessing, within an electronic device, a first signature of an electronic publication, and comparing the first signature with each of a plurality of signatures of a library. In response to a match of the first signature with a second signature of the plurality of signatures, an identifier of the electronic publication is determined. The method further includes communicating the identifier of the electronic publication over a communication channel and updating a data store based on the identifier of the electronic publication. In one embodiment, the data store includes a user profile.

In one embodiment, the method may further include receiving the electronic publication and accessing the electronic publication. The method may further include extracting text from the electronic publication and determining the first signature based on the text of the electronic publication. In another embodiment, the method includes sending a recommendation based on the identifier of the electronic publication. In one embodiment, the method includes sending an offer for the electronic publication based on the identifier of the electronic publication. In another embodiment, the method includes synchronizing a bookmark with a user profile based on an access of the electronic publication. In one embodiment, the method includes sending a copy of the electronic publication based on the data store.

In another embodiment, the present invention is implemented as a system for identifying an electronic publication. The system includes a signature generation module operable to analyze the electronic publication and based thereon to generate a first signature of an electronic publication and a signature matching module operable to determine a match of the first signature of the electronic publication with a second signature of a plurality of signatures. In one embodiment, the signature generation module is operable to generate the signature of the electronic publication based on text of the electronic publication. The system further includes an identifier module operable to determine an identifier corresponding to the electronic publication based on the match of the first signature of the electronic publication and the second signature of the plurality of signatures.

In one embodiment, the system may further include a data store access module operable to access a data store corresponding to a user profile to update the user profile based on the identifier of the electronic publication. The system may further include a bookmark module operable to synchronize a first bookmark corresponding to the electronic publication with a second bookmark of a user profile. The system may further include a recommendation module operable to determine a recommended electronic publication based on the identifier of the electronic publication. The system may further include an offer determination module operable to determine an offer for sale of the electronic publication based on the identifier of the electronic publication.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
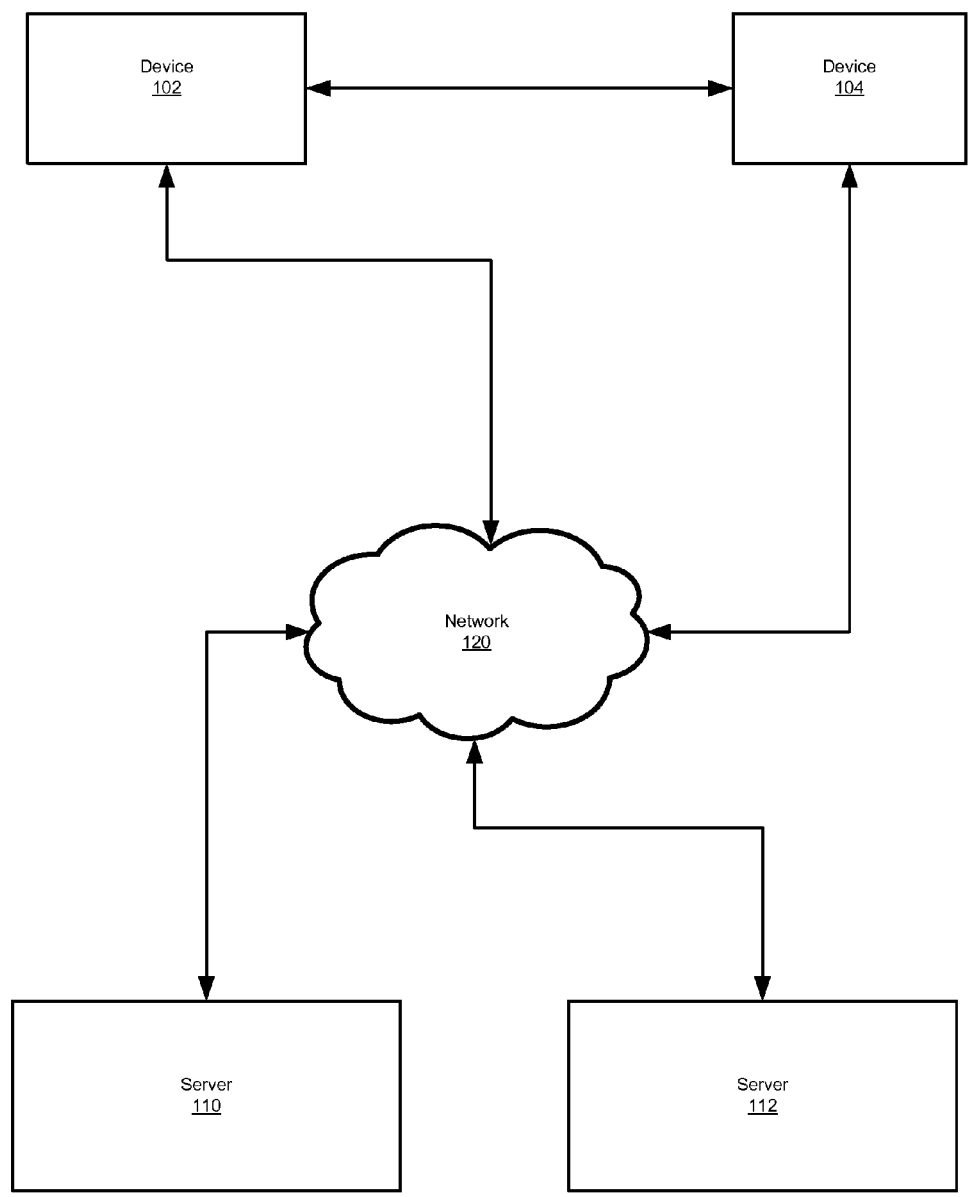
FIG. 1 shows exemplary components and an exemplary operating environment, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 500 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Systems and Methods for Electronic Document Identification

Embodiments of the present invention are operable to automatically identify an electronic document from a third party source and thereby provide value added services to the document based on the identification of the electronic document. The electronic documents may be acquired from an electronic publication source other than the electronic publication source associated with a prescribed provider of the device. The identification of the electronic document allows the electronic document to be added to an electronic document catalogue or library (e.g., user library of eBooks) of the device. The identification of the electronic document allows value added services including, but not limited to, bookmarking services (e.g., bookmark synchronization), recommendations, backup services, electronic documents offers, catalogue migration or importation (e.g., from other electronic document sources), and profile updating, etc. to be associated with the electronic document.

Figure 2:
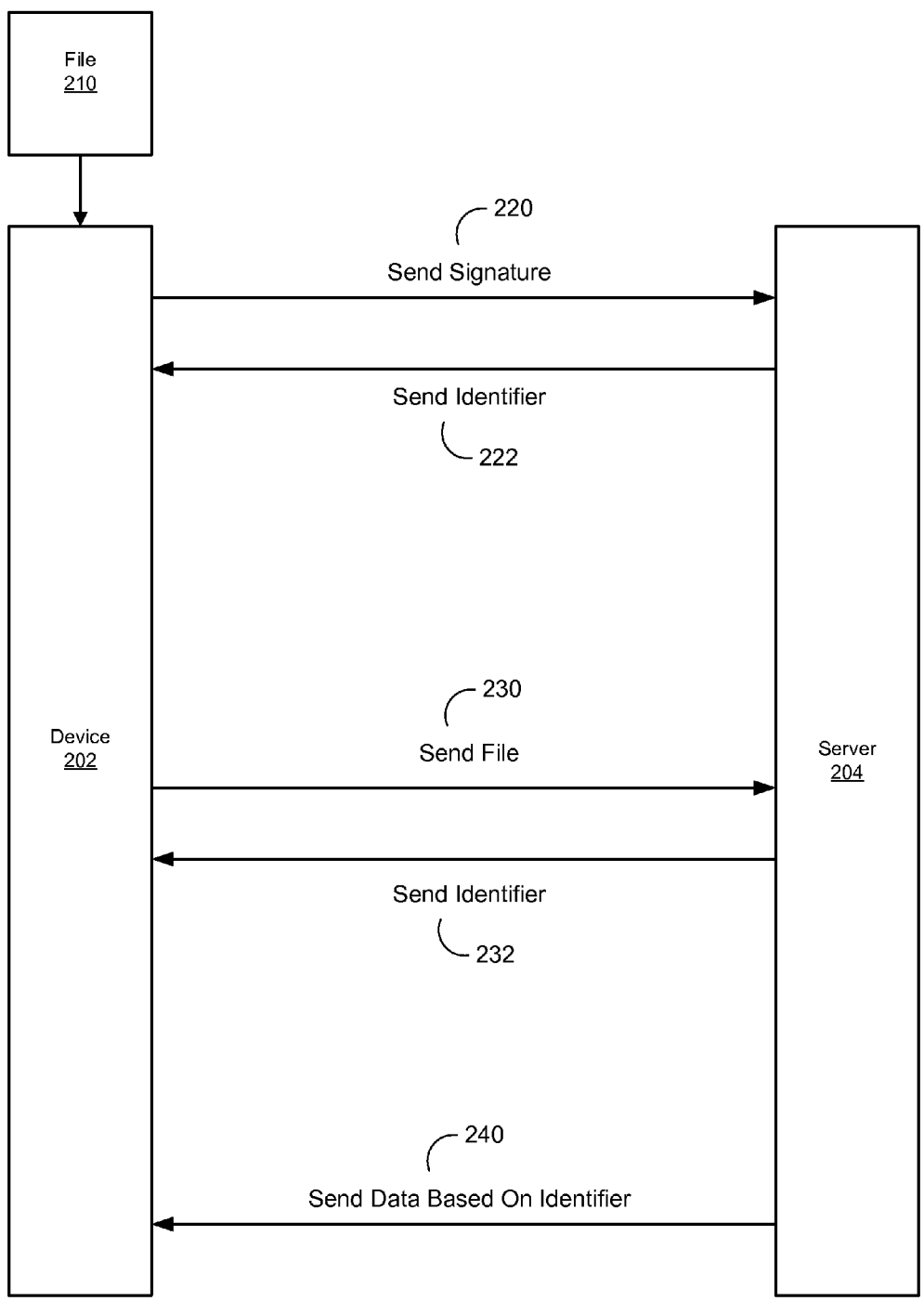
FIG. 2 shows exemplary communications between a device and a server, in accordance with one embodiment of the present invention.

FIGS. 1-2 illustrate example components used by various embodiments of the present invention. Although specific components are disclosed in FIGS. 1-2, it should be appreciated that such components are exemplary. That is, embodiments of the present invention are well suited to having various other components or variations of the components recited in FIGS. 1-2. It is appreciated that the components in FIGS. 1-2 may operate with other components than those presented, and that not all of the components of FIGS. 1-2 may be required to achieve the goals of embodiments of the present invention.

FIG. 1 shows exemplary components and an exemplary operating environment, in accordance with one embodiment of the present invention. Exemplary operating environment 100 includes device 102, device 104, network 120, server 110, and server 112. FIG. 1 depicts operating environment 100 with a device (e.g., device 102) operable to display electronic publications or documents and may receive electronic documents from more than one source (e.g., servers 110-112 and device 104).

Users of electronic reading devices (e.g., electronic ink readers, tablets, etc.) commonly have several ways of acquiring content for the devices (e.g., device 102). The content can come from providers of the devices, thereby allowing value added services to be provided, e.g., synchronizing bookmarks across devices, and personalized recommendations available to users.

Users can also acquire content from third party services or sources, e.g., by purchasing from other eBook vendors or acquiring or borrowing eBooks free from public libraries (e.g., physical or electronic libraries). The value added services described herein may not be available to such third party sourced documents, as the provider of the device is not able to match the third party books to the provider's catalogue. Embodiments of the present invention are operable to advantageously efficiently identify electronic books (eBooks) and other publications by extracting the text or content of an eBook, computing the "signature" of the eBook, and transmitting the signature to an external identification service, thereby allowing the device provider to match the third party book with the device provider's catalogue and provide the user with additional value added services.

In one exemplary embodiment, device 102 is an eReader device and may receive electronic documents (e.g., eBooks, electronic publications, etc.) from device 104, server 110, and server 112. Device 102 may be operable to execute an eReader application for display of electronic documents. Device 102 may further be operable to execute an electronic documents catalogue application operable for organizing and displaying information about the electronic documents in a catalogue or library. The electronic document catalogue may be associated with an electronic publication service that is available through an electronic publication company, e.g., via server 110, and may be associated with a provider of device 102. In one embodiment, the electronic publication service of server 110 is operable for previewing and/or purchasing electronic publications by a user of device 102 via network 120. Network 120 may include one or more networks and may include local area networks (LANs) (e.g., wired networks, Ethernet, wireless networks, etc.), intranets, wide area networks (WANs), and the Internet.

In one embodiment, electronic publications may further be accessed by device 102 via device 104 and/or server 112. Server 112 may provide an electronic publication service different from the electronic publication service of server 110 (e.g., a different electronic bookstore or marketplace). A user of device 102 may thus have a first account with the electronic publication service of server 110 and a second account with the electronic publication service of server 112. In one exemplary embodiment, the electronic publication service of server 112 may be an electronic publication library service (e.g., associated with a public library) that allows a user (e.g., of device 102) to borrow electronic publications (e.g., for a certain amount of time subject to renewal). Device 102 may also be used to access electronic documents that were self published or made with other publishing tools.

Electronic publications may also be loaded onto device 102 via another device (e.g., device 104). In one exemplary embodiment, devices 102 and device 104 are coupled via a universal serial bus (USB) connection. For example, device 104 may be a computing system which a user uses to download an eBook via network 120. Device 104 may then be used to load the downloaded electronic publication to device 102. It is appreciated that electronic publications may be loaded onto device 102 via a variety of other methods (e.g., memory storage devices, etc.).

FIG. 2 shows exemplary communications between a device and a server, in accordance with one embodiment of the present invention. Exemplary communications diagram 200 includes file 210, device 202, and server 204. FIG. 2 depicts exemplary communications between device 202 and server 204 during identification of an electronic document or electronic publication.

In one exemplary embodiment, file 210 includes an electronic document. Device 202 may receive file 210 via a variety of sources, e.g., various electronic documents sources or marketplaces, other devices, mobile devices, computing systems, servers, storage devices, etc., as described herein. File 210 may include an electronic publication or document that is an unidentified electronic publication or document with respect to an electronic catalogue of electronic documents on server 204. Device 202 may thus send information to an identification service executing on server 204 to identify the electronic document of file 210.

In response to receiving file 210, device 202 automatically determines a signature of the electronic document of file 210, as described herein. Device 202 may then send the signature as communication 220 to server 204 for further processing.

In one exemplary embodiment, the signature is generated by extracting the text from the electronic publication or document and then representing the document by a term frequency-inverse document frequency (TF-IDF) vector u of size $N=2^B$, where B is the number of bits used to represent each term (e.g., for English text, it could be done with 12 or 18 bits). Based on the TF-IDF vector u of size N, the lower-dimensional binary signature $s_H[u]$ of chosen size D is computed. The size of signature D may be 1024 or 2048 bits or can be increased or decreased depending on the computation power of the device and the amount of information that can be transmitted between the device and an identification service (e.g., of server 204). The signature $s_H[u]$ may then be transmitted to the identification server.

Server 204 then matches the signature to another signature of a catalogue of electronic document on server 204 which corresponds to the same or very similar electronic publication as included in file 210. Server 204 may then send an identifier of the electronic publication as communication 222 to device 202. Device 202 then updates a data store (e.g., a user profile) of electronic publications on device 202 based on the identifier received from server 204. Server 204 may also update a data store (e.g., a user profile) based on the identifier of the electronic publication.

In one exemplary embodiment, an identification service executed on server 204 has access to each of the electronic publications or documents in a catalogue, or corpus on the server (e.g., a catalogue of the electronic publications of an electronic book store). Each document v in the corpus may have a pre-computed signature $s_H[v]$. The goal of the identification service is to find out if the given signature $s_H[u]$ of an unknown document is similar or identical to a known signature (e.g., $s_H[v]$). If two signatures are sufficiently similar, then the two documents are very likely similar as well (e.g., thus, the unknown document can be identified as some document in the catalogue).

In one embodiment, the identification service (e.g., executing on server 204) receives a binary signature $s_H[u]$ from a device (e.g., device 202). The identification service compares the binary signature $s_H[u]$ to each known signature $s_H[v]$ by computing the approximate cosine similarity between documents u and v:

$$sim(u, v) = \cos\theta \approx \cos\left(\pi \frac{\text{Hamming}(s_H[u], s_H[v])}{|H|}\right),$$

where D=|H| is the size of the signature and Hamming( ) is the Hamming distance function.

If sim(u,v)=1 or sim(u,v) is greater than some empirically predetermined threshold (e.g., 0.90 or 0.95), the previously-unknown document u is identified as a known document v in the corpus.

In another embodiment, device 202 may send file 210 as communication 230 to server 204. File 210 may be sent to server 204 based on a determination of limited processing resources or power of device 202. In one exemplary embodiment, file 210 may be sent to server 204 as part of a synchronization process. Server 204 may then generate a signature of the electronic publication of file 210 and determine an identifier of the electronic publication of file 210, as described herein. Server 204 may then send device 202 the identifier of the electronic publication as communication 232.

In one exemplary embodiment, server 204 may send data based on the identifier of the electronic publication as communication 240. Communication data 240 may include recommendations, a copy of the electronic publication (e.g., a download), electronic publication offers, bookmarking synchronization data, and profile updates. The updating of the user profile enables the profile to better reflect a user's interests. For example, if server 204 has identified an electronic publication as "Pride and Prejudice" by Jane Austen, server 204 may recommend "Sense and Sensibility" based on being written by the same author or based on other users having read both books.

In one embodiment, server 204 may send a copy of an electronic publication based on providing a backup service (e.g., a cloud backup service). For example, if a user loses his or her device or the device is destroyed, a user is able to download copies of electronic publications acquired from third party sources that have been identified and added to the user's profile or account, as described herein. In one embodiment, the backup service may be subscription based service for which a user pays a yearly or other recurring fee.

In another embodiment, server 204 may provide bookmark information or synchronization. For example, if a user is on page ten of an electronic document acquired from a third party source on device 202, device 202 may send that information to server 204 which then synchronizes bookmarks for the electronic document on a second device of the user (not shown) so that when the user accesses the electronic publication on the second device page ten is displayed for convenience. Server 204 may thus synchronize bookmarks for a respective electronic document across multiple devices.

In one exemplary embodiment, server 204 may send an offer to purchase an electronic publication as a value added service. For example, if the electronic document of file 210 is borrowed from a library (e.g., as determined based on the digital rights management (DRM) or metadata of the electronic document limiting access), an offer to buy the electronic publication may be sent by server 204 to device 202. In one embodiment, a user is presented with an offer to purchase the electronic document at full price or a discount upon the user accessing the borrowed book near to or after the borrowing period has expired.

Embodiments of present invention may further allow importation of each book in a catalogue from a different electronic document service as yet another value added service. For example, a user may have an account with a $3^{rd}$ party provider of a plurality of electronic books and based on identification of the plurality of electronic books, the plurality of books may be imported to the catalogue of the provider of the device based on identification of each of the plurality of electronic books, as described herein. In one embodiment, an application executing on a personal computer may scan the books of a catalogue from other electronic document providers and send signatures to server 204 for the addition of the books to a catalogue of device 202.

Embodiments of the present invention may support a variety of electronic document formats including, but not limited to, Adobe DRM, available from a company "Adobe Systems" of San Jose, Calif., EPUB2 (electronic publication) and EPUB3 formats, MOBI format available from a company "Amazon.com" of Seattle, Wash., Portable Document Format (PDF), Microsoft Word documents, text files, etc. Embodiments of the present invention are further operable to identify electronic documents created by a user typing or entering the contents of a document or a book.

Figure 3:
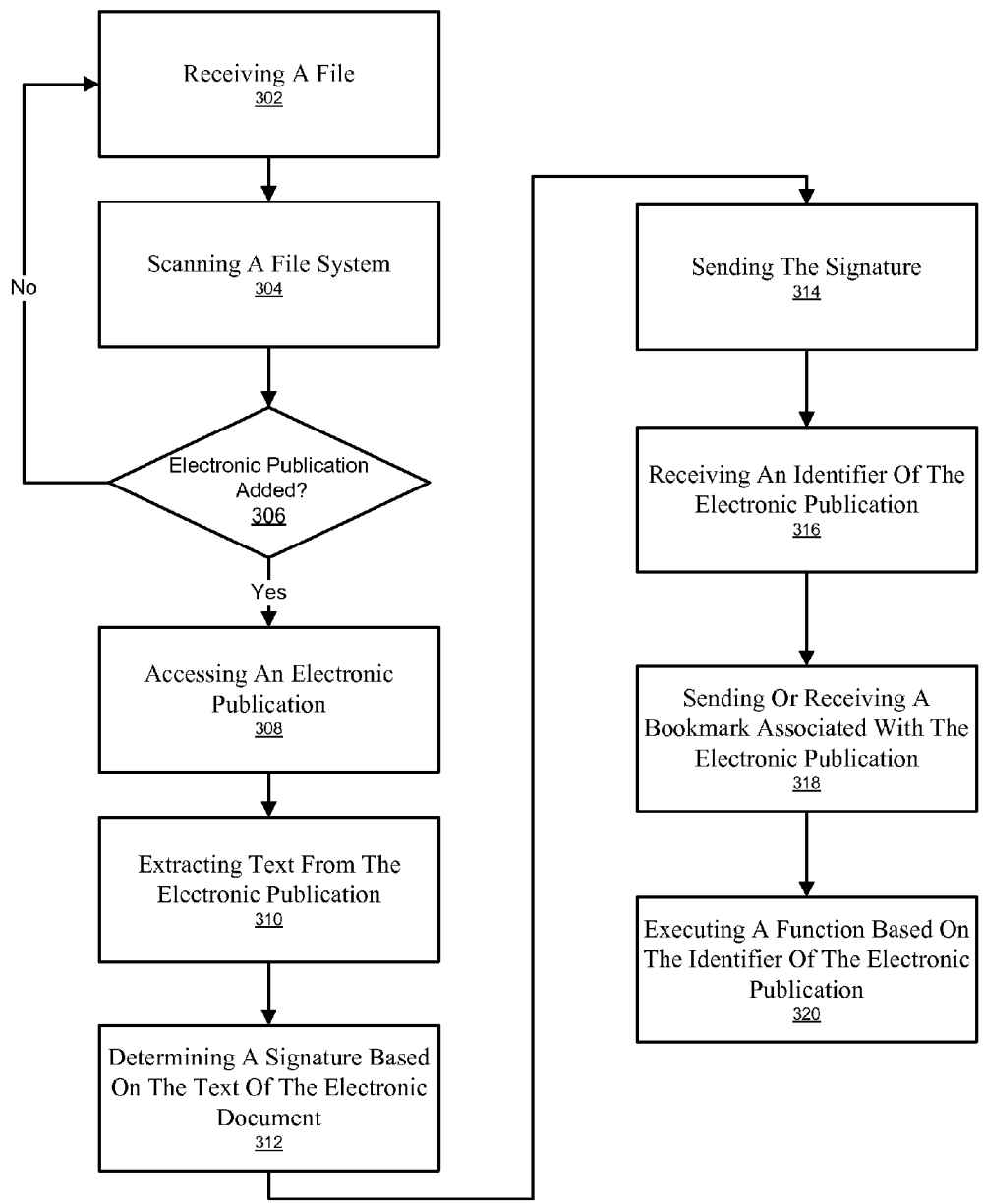
FIG. 3 shows a flowchart of an exemplary computer controlled process for identifying an electronic document on a device, in accordance with one embodiment of the present invention.
Figure 4:
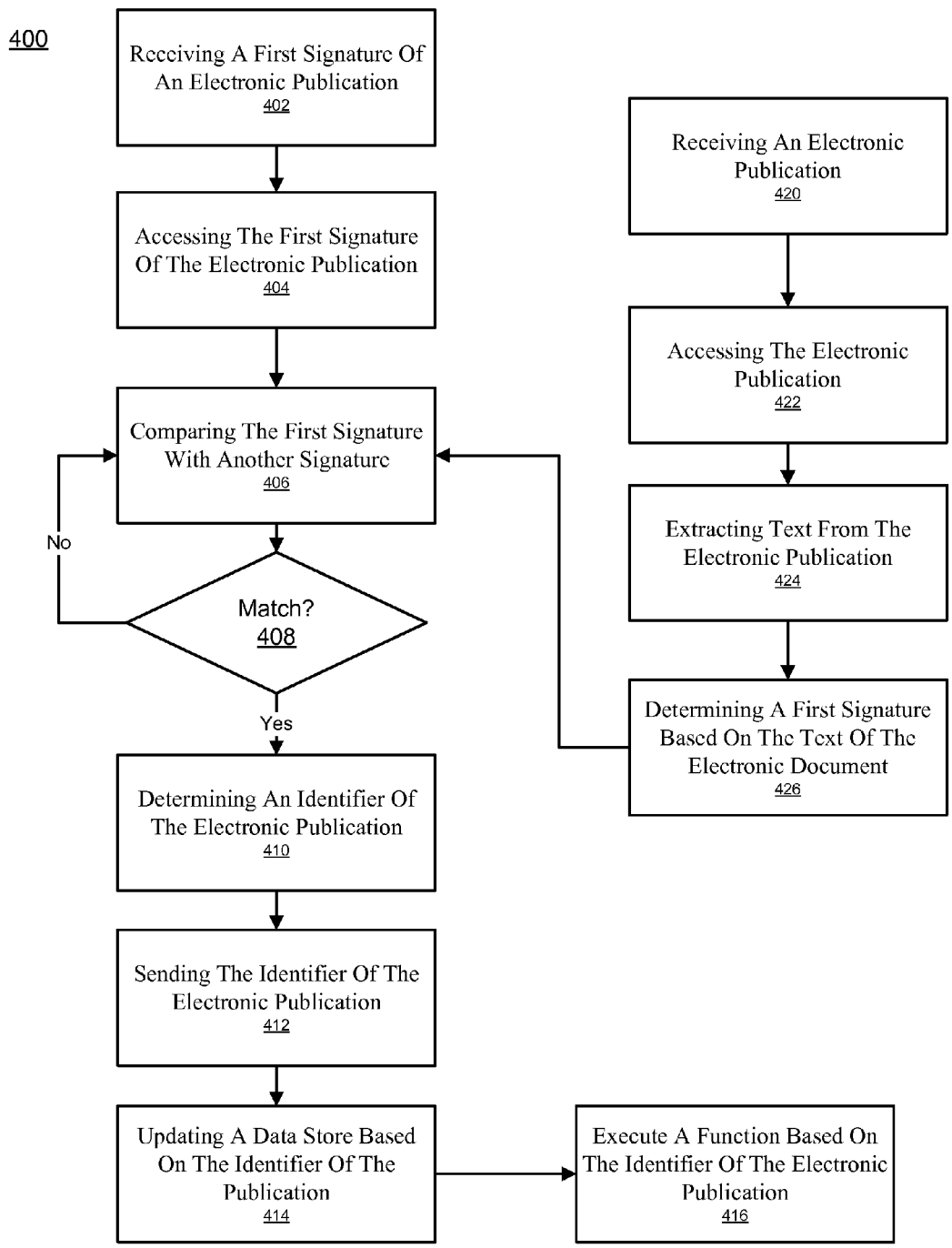
FIG. 4 shows a flowchart of an exemplary computer controlled process for matching a signature of an electronic document to identify an electronic document, in accordance with one embodiment of the present invention.

With reference to FIGS. 3-4, flowcharts 300-400 illustrate example functions used by various embodiments of the present invention for identifying electronic documents. Although specific function blocks ("blocks") are disclosed in flowcharts 300-400, such steps are examples. That is, embodiments are well suited to performing various other blocks or variations of the blocks recited in flowcharts 300-400. It is appreciated that the blocks in flowcharts 300-400 may be performed in an order different than presented, and that not all of the blocks in flowcharts 300-400 may be performed.

FIG. 3 shows a flowchart of an exemplary computer controlled process for automatically identifying an electronic document on a device, in accordance with one embodiment of the present invention. In one embodiment, FIG. 3 depicts a process 300 for identifying an electronic publication on a user device (e.g., an eReader, tablet, mobile device, computing system, etc.).

At block 302, a file is received or otherwise accessed. The file may include an electronic document or publication and may be received from a variety of sources, as described herein.

At block 304, a file system is scanned. In one embodiment, an electronic document application (e.g., eReader application) scans a file system automatically, periodically, or when new files are added to the file system for new electronic documents. In one exemplary embodiment, the scanning of the file system is performed in response to the ejecting of a device coupled to an eReader capable device.

At block 306, whether an electronic publication was added to the file system is determined. If an electronic publication was added to the file system, block 308 may be performed. If an electronic publication was not added to the file system, block 302 may be performed.

At block 308, an electronic publication or electronic document is accessed. In one embodiment, the electronic publication is accessed within an electronic device.

At block 310, text is extracted from the electronic publication. In one embodiment, each word of the contents (e.g., each word of each chapter) of the electronic publication is extracted.

At block 312, a signature (e.g., extract or digest or hash) based on the text of the electronic publication is determined. The signature may be generated by a desktop application, mobile application, eReader application, etc. executing on a desktop computing system, smartphone, tablet, etc. The signature may be based on representing a text document as a vector in multidimensional space where each dimension represents a word. In one exemplary embodiment, the signature is represented with a TF-IDF (term frequency-inverse document frequency) vector, where a given term is represented by the fraction of times it occurs in the document divided by the log fraction of all documents in the corpus that the term appears in. The terms with high TF-IDF values may be most relevant to representing a given document (e.g., tennis with high TF-IDF values appear with high frequency within a particular document but are less common in other documents).

The size of the TF-IDF vector may be the size of the corpus dictionary (e.g., the number of distinct terms in all the documents in the corpus). For example, the dictionary size could be very large with millions of terms. In one embodiment, for practical purposes of computing similarities between documents, the size of the dictionary may be reduced using a hash function to map each distinct term to an integer, (e.g., 32-bits or 64-bits), and then using the first B bits of the hashed integer to represent each term. For example, a practical value of B=18 bits results in a TF-IDF vector size of $2^{18}=262,144$. It is appreciated that the use of the first B bits of the hashed integer may end up treating two different terms as the same (e.g., due to identical hash values of the portions of the hashed values used), for similarity computations such collision are very rare and practically inconsequential.

In one exemplary embodiment, the TF-IDF vector is computed by first computing the TF or term frequency representation of the document. A B-bit hash for each term in the document is computed and counts for each term in a document are stored in a $2^B$-size count vector. Then each term count is divided by the total number of terms in the document. This results in the TF representation of the document.

The TF-IDF representation may then be computed. The TF-IDF representation may then be computed by multiplying each term's TF value by the term's IDF value. The IDF values for each term may be pre-computed (e.g., using the whole corpus of available documents) and the IDF values may be stored beforehand on a device (e.g., device 202).

At block 314, the determined signature is communicated to another device or process. In one exemplary embodiment, the signature is sent to a server for matching with a plurality of signatures each corresponding to electronic publications of a catalogue on the server. In another embodiment, the signature may be matched on a device to a plurality of signatures each corresponding to electronic publications without the signature being sent (e.g., matched locally instead of being sent to a server).

At block 316, an identifier of the electronic publication is received. In one embodiment, the identifier is received from an identification server executing on a server.

At block 318, a bookmark associated with the electronic document is sent or received. In one embodiment, a bookmark associated with the electronic document may be sent to synchronize with a corresponding bookmark in a user's profile. In another embodiment, a bookmark associated with the electronic document is received based on synchronizing a bookmark of a user's profile (e.g., on a server) with the identified electronic document.

At block 320, a function is executed based on the identifier of the electronic publication. The function may include displaying a recommendation based on the identifier of the electronic document or may include a catalogue importation function. The function may also include a bookmark synchronization function based on the identifier of the electronic document or may include updating a profile based on the identifier of the electronic document. The function may include displaying an offer for purchase of the electronic document.

FIG. 4 shows a flowchart of an exemplary computer controlled process for matching a signature of an electronic document to identify an electronic document, in accordance with one embodiment of the present invention. In one embodiment, FIG. 4 depicts a process 400 for identifying an electronic document on a remote device (e.g., server, remote computing system, etc.).

At block 402, a first signature of an electronic publication is received. In one embodiment, the signature may be received from an eReader device or other computing system that computed the signature.

At block 404, the first signature is accessed. In one embodiment, the first signature may be accessed within an electronic device.

At block 406, the first signature is compared with another signature. As described herein, the first signature may be compared with each of a plurality of signatures each corresponding to each of a plurality of electronic documents in a catalogue.

At block 408, whether the first signature matches a second signature is determined. In one embodiment, the matching of the signatures may be based on the matching of TF-IDF vectors of corresponding documents, as described herein.

In one exemplary embodiment, the matching is based on two vectors u and v with the angle θ between them. The cosine similarity sim(u,v) between these two vectors may be expressed as:

$$sim(u, v) = \cos\theta = \frac{u \cdot v}{\|u\|\|v\|}$$

A random hyperplane h through the origin may then be used and represented by a normal vector r. The probability that a random hyperplane separates ally two vectors u and v (e.g., one vector lies above the hyperplane and another vector below the hyperplane) is directly proportional to the angle θ between u and v. This may be expressed as:

$$Pr[\text{sign}(u \cdot r) \neq \text{sign}(v \cdot r)] = \frac{\theta}{\pi}$$

With $h_r(u)$ being a binary function defined as:

$h_r(u) = \{_{0, \text{ otherwise}}^{1, \text{ if } (u \cdot r) \geq 0}$

Therefore, the similarity may be expressed as:

$sim(u,v) = \cos\theta \approx \cos(\pi Pr[h_r(u) \neq h_r(v)])$

With an indicator function I[.] and a set of randomly generated hyperplanes H (with the corresponding set of representative normal vectors R), the probability $Pr[h_r(u) \neq h_r(v)]$ can be empirically estimated as:

$$Pr[h_r(u) \neq h_r(v)] \approx \frac{\sum_{r \in R} I[h_r(u) \neq h_r(v)]}{|R|}$$

$$Pr[h_r(u) \neq h_r(v)] = \frac{\text{Hamming}(s_H[u], s_H[v])}{|R|},$$

where $s_H[u]$ and $s_H[v]$ are binary signature vectors (e.g., generated using the set of random hyperplanes H):

$$s_H[u] = [h_{r_1}(u), h_{r_2}(u), \ldots, h_{r_{|H|}}(u)]$$

The Hamming distance between two vectors is the number of elements (e.g., bits, in the case of binary vectors) where the two vectors differ. The expression above simply states that the probability $Pr[h_r(u) \neq h_r(v)]$ can be estimated as the fraction of different bits in the two signature vectors $s_H[u]$ and $s_H[v]$.

Therefore, given a set of random hyperplanes H, the cosine similarity between vectors u and v can be approximated by first computing binary vector signatures (which can be of much lower dimensionality than original vectors) and then using those signatures according to the following equation:

$$sim(u, v) = \cos\theta \approx \cos\left(\pi \frac{\text{Hamming}(s_H[u], s_H[v])}{|H|}\right)$$

In one embodiment, the computing of the vector signatures relies on a set of uniformly randomly generated hyperplanes H (or, e.g., equivalently, a set of randomly generated vectors R orthogonal to those hyperplanes). To generate a randomly directed vector r, we can sample each component of r from a normal (e.g., Gaussian) distribution. Let N be the size of the vectors u and v (e.g., the number of hyperplane dimensions). Let D be the size of the signature vectors. To compute a low-dimensional signature $s_H[u]$ of a vector u, D random vectors r are generated, each of size N. In other words, $|D\|N|$ random numbers drawn from a normal distribution are generated. In one embodiment, D may be relatively small, e.g., 512 or 2048 bits, whereas N can be as large as, e.g., 65,536 or 262,144. The $|D\|N|$ random normally distributed numbers may be generated several ways depending on the memory and processing power requirements.

In one exemplary embodiment, a $|D|$ by $|N|$ matrix P is generated, whose rows are random vectors r representing hyperplanes in H. In one embodiment, H may be generated based on randomly sampling $|D\|N|$ normally distributed numbers once and storing the matrix P for later computations. The size of P could be on the order of several gigabytes. The use of matrix P would thus likely be feasible for signature calculations done on a server and less practical if signatures are to be computed on devices with limited memory (e.g., electronic readers or smartphones).

In one embodiment, the matrix P is generated using a random number generator with a predefined seed. For the matrix P to be the same across many devices, the matrix P can be generated on the fly by seeding a random number generator on each computing device with the same predefined seed. Thus, instead of storing matrix P, each computing device may generate the matrix P given a predefined random generator seed.

In another embodiment, the matrix P is generated by using a hash function. For example, a hash function $f_s$ (e.g., murmurhash) with an initial seed s whose range is positive 32-bit integers. It is appreciated that the matrix P may be generated using a hash function with any range size. A vector of K uniform numbers in the range [0;1] can be generated as $[f_s(1)/2^{32}, f_s(2)/2^{32}, \ldots f_s(K)/2^{32}]$. To generate normal random numbers, two uniformly random numbers may be used. In one exemplary embodiment, the Box-Muller transform (e.g., http://en.wikipedia.org/wiki/Box-Muller_transform) is used to convert two uniformly distributed random numbers into two normally distributed random numbers. For example, if $u_1$ and $u_2$ may be two uniformly generated random numbers, then $\sqrt{-2\log u_1} \cos(2\pi u_2)$ is a normally distributed random number. To generate $K=|D\|N|$ normally distributed random entries of matrix P given a seed s, two hash function $f_s$ and $f_{s+1}$ may be used to compute the $k^{th}$ entry as:

$$\sqrt{-2\log f_s(k)/2^{32}} \cos(2\pi f_{s+1}(k)/2^{32})$$

Embodiments of the present invention may thus reduce the storage requirements on the device from several gigabytes (e.g., if the whole matrix P is to be stored) to just 4 bytes for the random seed. In one embodiment, the hash function may be used in place of the random generator method because the hash function may avoid issues of synchronization (e.g., if the random numbers are generated in parallel) and issues with requiring identical random number generators across devices.

Embodiments of the present invention are operable to match electronic documents based on words thereby allowing the matching of documents which may have different order of the chapters or differences in the text.

If the first signature matches the second signature, block 410 may be performed. If the first signature does not match the second signature, block 406 may be performed and the first signature compared to another signature.

At block 410, an identifier of the electronic publication is determined. As described herein, the identifier may be determined by matching the signature of the unidentified electronic document to a signature of a document in a catalogue of electronic documents.

At block 412, the identifier of the electronic publication is sent. In one embodiment, the identifier of the electronic publication is sent to a user device (e.g., an eReader device performing process 300).

At block 414, a data store is updated based on the identifier of the electronic publication. In one embodiment, the data store includes a user profile or user account that is used to store a user's interests, a user's electronic documents, and a user's bookmarks corresponding to each electronic document.

At block 416, a function is executed based on the identifier of the electronic publication. The function may include sending a recommendation based on the identifier of the electronic publication or may include sending an offer for the electronic publication based on the identifier of the electronic publication. In one embodiment, the function may include synchronizing a bookmark with a user profile based on an access of the electronic publication. In another embodiment, the function may include sending a copy of the electronic publication based on the data store (e.g., as part of a backup service, as described herein).

At block 420, an electronic publication is received. In one exemplary embodiment, the electronic publication may be received from a user device or from another electronic publication service (e.g., via an import process). For example, for a device with relatively limited computational resources or power, the electronic document may be uploaded to a server for determination of a signature and identification of the electronic document.

At block 422, the electronic publication is accessed, as described herein.

At block 424, text from the electronic publication is extracted, as described herein.

At block 426, a first signature of the electronic publication is determined based on the text of the electronic document, as described herein.

Figure 5:
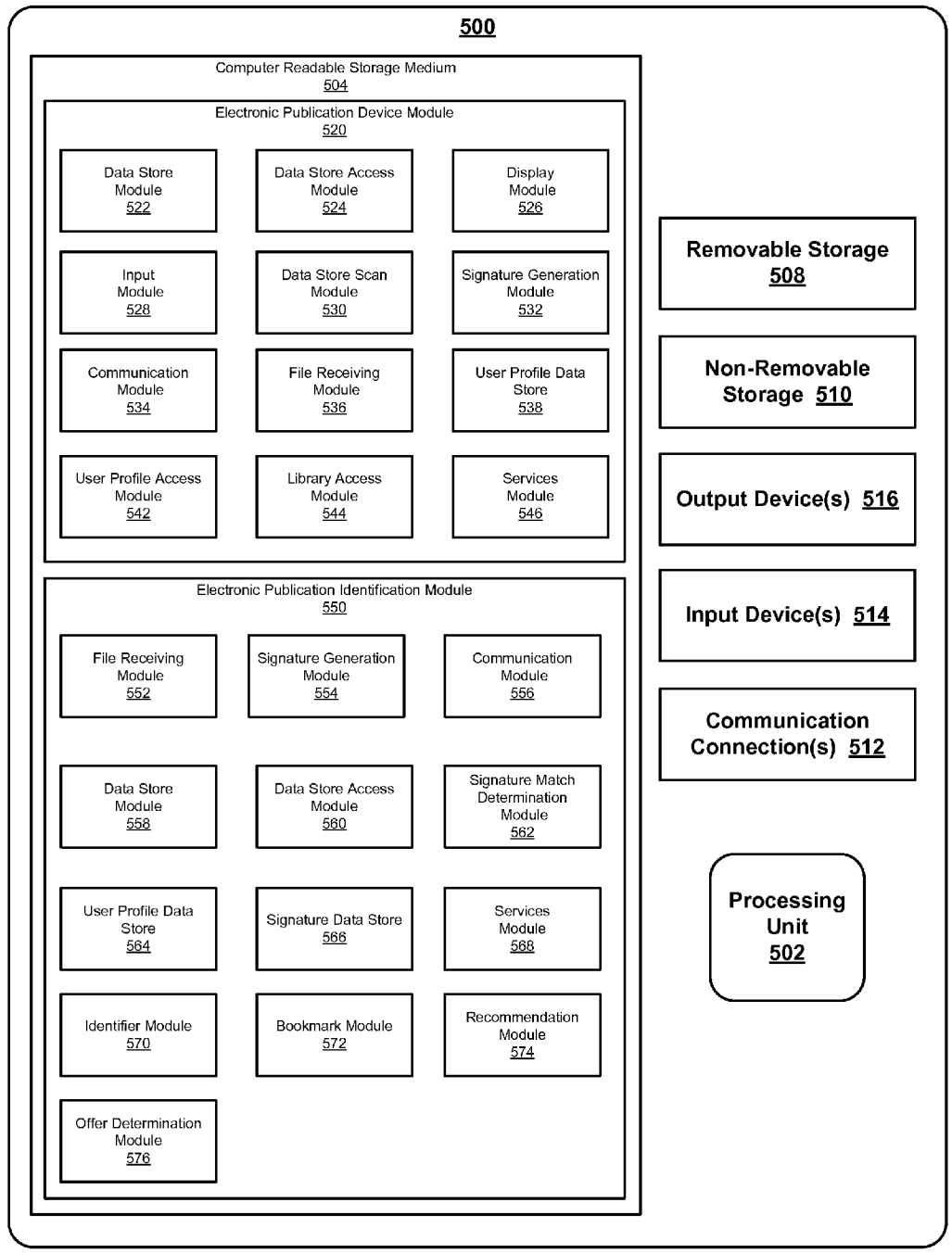
FIG. 5 shows a block diagram of an exemplary computing system and corresponding modules, in accordance with one embodiment of the present invention.

FIG. 5 illustrates exemplary components used by various embodiments of the present invention. Although specific components are disclosed in computing system environment 500, it should be appreciated that such components are exemplary. That is, embodiments of the present invention are well suited to having various other components or variations of the components recited in computing system environment 500. It is appreciated that the components in computing system environment 500 may operate with other components than those presented, and that not all of the components of system 500 may be required to achieve the goals of computing system environment 500.

FIG. 5 shows a block diagram of an exemplary computer system and corresponding modules, in accordance with one embodiment of the present invention. With reference to FIG. 5, an exemplary system module for implementing embodiments includes a general purpose computing system environment, such as computing system environment 500. Computing system environment 500 may include, but is not limited to, servers, desktop computers, laptops, tablet PCs, tablet computing devices, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitate efficient execution of memory operations or requests for groups of threads. Computing system environment 500 may further include a power source (e.g., battery) (not shown) operable to allow computing system environment 500 to be movable and mobile while operating.

Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a touch screen (e.g., capacitive touch screen), keyboard, mouse, pen, voice input device, touch input device, remote control, camera, etc. Output device(s) 516 such as a display (e.g., touch screen), speakers, etc. may also be included. All these devices are well known in the art and are not discussed at length.

In one embodiment, computer readable storage medium 504 includes electronic document device module 520 and electronic document identification module 550. In one embodiment, electronic document device module 520 include data store module 522, data store access module 524, display module 526, input module 528, data store scan module 550, signature generation module 532, communication module 534, file receiving module 536, user profile data store 538, user profile access module 542, library access module 544, and services module 546.

Data store access 522 module is operable to access data store module 524 (e.g., to access an electronic document and/or a user profile based on a request from input module 528). In one embodiment, data store access module 524 operable to access a data store corresponding to a user profile to update the user profile based on an identifier of the electronic publication.

Display module 526 is operable to display electronic documents, as described herein. Input module 528 is operable to receive an input associated reading of an electronic document via system 500.

Data store scan module 530 is operable to scan a file system for updates (e.g., addition of electronic documents), as described herein. Signature generation module 532 operable to generate a first signature of an electronic publication, as described herein. In one embodiment, signature generation module 532 is operable to generate the signature of the electronic publication based on text of the electronic publication.

Communication module 534 is operable for communication with other devices (e.g., device 104 and server 204) to receive electronic documents, send signatures, and receive electronic document identifiers, as described herein. File receiving module 536 is operable to receive files that may include electronic documents, as described herein. User profile data store 538 is operable to store data including a user's profile which may include electronic documents in a user's account and a user's interests. User profile access module 542 is operable for accessing user profile data store 538 to update a user's profile based on a determined identifier of an electronic document, as described herein. Library access module 544 is operable to access a user's library or catalogue of electronic documents (e.g., eBooks) for navigation and display of the electronic documents. Services module 546 may execute or invoke functions corresponding to value added services based on an identifier of an electronic document, as described herein (e.g., bookmark synchronization, recommendations, backup services, etc.).

Electronic document identification module 550 includes file receiving module 552, signature generation module 554, communication module 556, data store module 558, data store access module 560, signature match determination module 562, user profile data store 564, signature data store 566, and services module 568.

File receiving module 552 is operable for receiving files that may include electronic documents, as described herein (e.g., from a device with relatively low computational power). Signature generation module 554 operable to generate a first signature of an electronic publication, as described herein. In one embodiment, signature generation module 554 is operable to generate the signature of the electronic publication based on text of the electronic publication.

Communication module 556 is operable for communication with other devices (e.g., device 202) to receive electronic documents, send electronic identifiers, and execute or invoke functions based on an identifier of an electronic document, as described herein.

Data store access 560 module is operable to access data store module 558 (e.g., to access an electronic document and/or a user profile). In one embodiment, data store access module 560 is operable to access user profile data store 564 corresponding to a user profile to update the user profile thereof based on an identifier of the electronic publication. Data store access module 560 is further operable to access signature data store 566, which includes respective signatures for each of a plurality of electronic documents of a catalogue, as described herein. Services module 568 is operable to execute or invoke functions corresponding to value added services based on an identifier of an electronic document, as described herein (e.g., bookmark synchronization, recommendations, backup services, etc.).

Signature match determination module 562 is operable to match the first signature of the electronic publication with a second signature of a plurality of signatures e.g., of signature data store 566), as described herein.

Identifier module 570 is operable to determine an identifier corresponding to the electronic publication based on a match of the first signature of the electronic publication and a second signature of the plurality of signatures.

Bookmark module 572 is operable to synchronize a first bookmark corresponding to the electronic publication with a second bookmark of a user profile. Recommendation module 574 is operable to determine a recommended electronic publication based on the identifier of the electronic publication, as described herein.

Offer determination module 576 is operable to determine an offer for sale of the electronic publication based on the identifier of the electronic publication.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for automatically identifying an electronic document, said method comprising:
    accessing, within an electronic device, said electronic document local to the electronic device;
    extracting text from said electronic document;
    generating, using circuitry, a signature based on said text of said electronic document by calculating a frequency of a term in said text of said electronic document;
    communicating said signature over a communication channel;
    receiving an identifier of said electronic document over said communication channel, wherein said identifier is determined by a server matching said signature against a signature library, the identifier being different from the signature, said matching being performed by determining whether an approximation of a cosine similarity value computed using Hamming distance function between said signature and a signature in the signature library is greater than a predetermined threshold;
    receiving a bookmark associated with said electronic document; and
    receiving, from the server, a recommendation based on the identifier of said electronic document, the recommendation being specific to the electronic document and different from the electronic document.

2. The method as described in claim 1, further comprising:
    in response to receiving said identifier of said electronic document, executing a function associated with said electronic document based on said identifier of said electronic document.

3. The method as described in claim 2, wherein said function comprises displaying the recommendation based on said identifier of said electronic document.

4. The method as described in claim 2, wherein said function comprises a catalogue importation function.

5. The method as described in claim 2, wherein said function comprises a bookmark synchronization function based on said identifier of said electronic document.

6. The method as described in claim 2, wherein said function comprises updating a profile based on said identifier of said electronic document.

7. The method as described in claim 2, wherein said function comprises displaying an offer for purchase of said electronic document.

8. A method of automatically identifying an electronic publication, said method comprising:
    receiving from an electronic device said electronic publication local to the electronic device;
    extracting text from said electronic publication;
    determining, using circuitry, a first signature of said electronic publication based on said text of said electronic publication by calculating a frequency of a term in said text of said electronic document;
    comparing said first signature with each of a plurality of signatures of a library, said comparing being performed by determining whether an approximation of a cosine similarity value computed using Hamming distance function between said first signature and a second signature of said plurality of signatures in the signature library is greater than a predetermined threshold to determine a match;

in response to said match of said first signature with said second signature of said plurality of signatures, determining an identifier of said electronic publication, the identifier being different from the first signature and the second signature;

transmitting to said electronic device said identifier of said electronic publication over a communication channel;

transmitting to said electronic device a recommendation based on the identifier of said electronic document, the recommendation being specific to the electronic document and different from the electronic document; and updating a data store based on said identifier of said electronic publication.

9. The method as described in claim 8, wherein said data store comprises a user profile.

10. The method as described in claim 8 further comprising:

sending an offer for said electronic publication as the additional data recommendation based on said identifier of said electronic publication.

11. The method as described in claim 8 further comprising:

synchronizing a bookmark with a user profile based on an access of said electronic publication.

12. The method as described in claim 8 further comprising:

sending a copy of said electronic publication based on said data store.

13. A system for automatically identifying an electronic publication, said system comprising:

circuitry configured to:

receive from an electronic device said electronic publication local to the electronic device;

extract text from said electronic publication;

generate a first signature of said electronic publication based on said text of said electronic publication by calculating a frequency of a term in said text of said electronic document;

determine a match of said first signature of said electronic publication with a second signature of a plurality of signatures, said match being determined by determining whether an approximation of a cosine similarity value computed using Hamming distance function between said first signature and said second signature is greater than a predetermined threshold;

determine an identifier corresponding to said electronic publication based on said match of said first signature of said electronic publication and said second signature of said plurality of signatures, the identifier being different from the first signature and the second signature;

transmit to said electronic device said identifier of said electronic publication over a communication channel;

transmit to said electronic device a recommendation based on the identifier of said electronic document, the recommendation being specific to the electronic document and different from the electronic document; and update a data store based on said identifier of said electronic publication.

14. The system as described in claim 13, wherein the circuitry is configured to access the data store corresponding to a user profile to update said user profile based on said identifier of said electronic publication.

15. The system as described in claim 13, wherein the circuitry is configured to synchronize a first bookmark corresponding to said electronic publication with a second bookmark of a user profile.

16. The system as described in claim 13, wherein the circuitry is configured to determine a recommended electronic publication as the recommendation based on said identifier of said electronic publication.

17. The system as described in claim 16, wherein the circuitry is configured to determine an offer for sale of said electronic publication as the recommendation based on said identifier of said electronic publication.

* * * * *